US00RE37612E

(19) United States
(12) Reissued Patent
Gleichenhagen et al.

(10) Patent Number: US RE37,612 E
(45) Date of Reissued Patent: Mar. 26, 2002

(54) RESIDUELESSLY REDETACHABLE CONTACT-ADHESIVE SHEETLIKE STRUCTURES

(75) Inventors: Peter Gleichenhagen, Hamburg; Ekkehard Behrend, Düren-Merken; Peter Jauchen, Hamburg, all of (DE)

(73) Assignee: Beiersdorf AG, Hamburg (DE)

(21) Appl. No.: 08/457,074

(22) Filed: Jun. 1, 1995

Related U.S. Patent Documents

Reissue of:
(64) Patent No.: 4,587,152
Issued: May 6, 1986
Appl. No.: 06/680,422
Filed: Dec. 11, 1984

U.S. Applications:

(63) Continuation of application No. 07/028,421, filed on Mar. 18, 1987, now abandoned.

(30) Foreign Application Priority Data

Dec. 21, 1983 (DE) ..... 33 46 100

(51) Int. Cl.[7] ..... B32B 3/10; B32B 7/14; C09J 7/02; C09J 3/14

(52) U.S. Cl. ..... 428/195; 428/198; 428/339; 428/343; 428/345; 428/355 RA

(58) Field of Search ..... 427/208.6; 428/195, 428/198, 339, 343, 345, 355, 355 RA

(56) References Cited

U.S. PATENT DOCUMENTS

| | | | | | |
|---|---|---|---|---|---|
| 2,294,347 | A | * | 8/1942 | Bauer et al. | 428/343 |
| 2,510,120 | A | * | 6/1950 | Leander | 428/343 |
| 3,301,741 | A | * | 1/1967 | Hendrickson et al. | 428/343 |
| 3,627,559 | A | * | 12/1971 | Chen | 428/343 |
| 3,691,140 | A | * | 9/1972 | Silver | 524/813 |
| 4,004,049 | A | * | 1/1977 | Horwat et al. | 427/208.6 |
| 4,076,881 | A | * | 2/1978 | Sato | 428/198 |
| 4,333,980 | A | * | 6/1982 | Russell | 428/198 |

FOREIGN PATENT DOCUMENTS

| | | | |
|---|---|---|---|
| DE | 2460855 | | 6/1976 |
| JP | 95972 | | 8/1981 |
| JP | 117578 | | 7/1982 |
| JP | 49773 | | 3/1983 |
| NL | 17072 | * | 6/1970 |

* cited by examiner

*Primary Examiner*—Daniel Zirker
(74) *Attorney, Agent, or Firm*—Norris McLaughlin & Marcus

(57) ABSTRACT

Residuelessly redetachable contact-adhesive sheet-like structures wherein are provided approximately calotte-shaped bonding sites which are up to about 600 $\mu$m in diameter at the base where the calottes stick to the sheet-like structure and which are produced by screen or gravure printing using high-solids dispersion of adhesive substance.

20 Claims, 1 Drawing Sheet

RESIDUELESSLY REDETACHABLE CONTACT-ADHESIVE SHEETLIKE STRUCTURES

Figure 1:
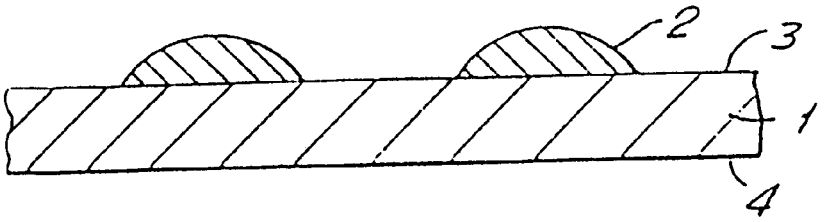

Matter enclosed in heavy brackets [ ] appears in the original patent but forms no part of this reissue specification; matter printed in italics indicates the additions made by reissue.

*This application is a continuation of patent application Ser. No. 07/028,421, filed Mar. 18, 1987 now abandoned, which is a reissue of patent application Ser. No. 06/680,422, filed Dec. 11, 1984, now U.S. Pat. No. 4,587,152.*

The present invention relates to contact-adhesive sheetlike structures which, after attachment, can be residuelessly redetached and, if desired, attached again. Sheet-like structures of this type have long been used in practice, examples thereof being residuelessly detachable reversibly adherent contact-adhesive labels, protective films, masking papers, note sheets and advertising materials and residuelessly detachable and reattachable cohesive plasters and dressings.

A number of different contact-adhesive materials and manufacturing methods have already been described for these purposes.

German Offenlegungsschrift No. 2,407,494 describes a weakly contact-adhesive emulsion polymer which is prepared by copolymerizing 2-ethylhexyl acrylate, methyl methacrylate, (meth)acrylic acid and 1,4-butanediol diacrylate in the presence of plasticizers such as paraffin oil, squalene or low molecular weight polyisobutylene and, owing to its relatively low adhesivity, permits redetachability of the contact-adhesive articles equipped therewith.

Japanese Pat. No. 82/87,481 describes an aqueous contact-adhesive dispersion which is prepared by copolymerizing esters of acrylic acid with alkyl radicals of 4 or more carbon atoms, methacrylic acid and N-methylolacrylamide in the presence of special plasticizers. After addition of thickening agents these dispersions are suitable for equipping reversibly adherent paper labels. Japanese Pat. No. 82/70,162 describes a similar process.

Japanese Pat. No. 82/31,972 describes an emulsion copolymer which is prepared from 2-ethylhexyl acrylate, methyl methacrylate, acrylic acid, itaconic acid and ethylene dimethacrylate and, after buffering with sodium acetate and thickening with hydroxyethyl cellulose, is suitable as a contact adhesive for redetachable contact adhesive articles.

Japanese Pat. No. 82/42,778 describes a weakly contact-adhesive bead copolymer which is prepared in aqueous dispersion from (meth)acrylic esters in the presence of a dispersant. Said water-soluble dispersant consists of a copolymer which is obtained by free-radical copolymerization from a low proportion of butyl acrylate and a high proportion of acrylic acid.

U.S. Pat. No. 3,691,140 and German Offenlegungsschrift No. 2,417,312 describe the production of redetachable, repeatedly usable contact-adhesive articles whose contact-adhesive layer consists of contact-adhesive microspheres. Said microspheres are synthesized in aqueous dispersion in the presence of anionic emulsifiers by copolymerizing alkyl acrylates, special water-soluble ionic monomers and maleic anhydride. To improve the anchoring, the microspheres are affixed to the carrier materials by means of special anchoring layers.

In U.S. Pat. No. 2,510,120, the redetachability of contact-adhesive sheetlike structures is improved by coating part of the surface, for example in the form of strips or other two-dimensional patterns.

German Offenlegungsschrift No. 2,535,897 describes a part-surface application of contact-adhesive compositions to label paper by using an engraved roll to coat only the label area in full before the punching out.

Contact-adhesive articles which are equipped with suitable contact-adhesive compositions by the cited methods have not only advantageous properties but also serious shortcomings.

1. Plasticizers, which are frequently contained in the contact-adhesive compositions described, for example paraffin oils, tend to bleed out of the composition and can stain the carrier materials, for example paper. This also affects the adhesive properties. Finally, on prolonged attachment they can also penetrate into the attached substrates.

2. Thickeners and emulsifiers settle out on the contact-adhesive particles as the emulsion dries and forms a film; they reduce the adhesivity and promote, in particular, the absorption of water by the contact-adhesive films in dependence upon the ambient humidity and the moisture content of the attached substrates. The plasticizing action of even small amounts of water affects the adhesion properties in an uncontrollable manner; this impairs the usability of contact-adhesive articles of this type.

3. The adhesivity of a whole-surface coat of contact adhesive increases with the duration of attachment, since, to form a bond, films of contact adhesive must possess some flow, albeit limited, because without that property the substrate on which attachment is to take place cannot be wetted. In the case of short-lived attachment, only the protuberances of the substrate surface are wetted, and the strength of attachment is correspondingly low. As the duration of attachment increases, the contact adhesive flows also into the indentations of the substrate surface, which is normally not microscopically smooth. As a result, the force required to separate the attached surfaces rises to two to three times the starting values. As a consequence, the carrier material or the contact adhesive film can split (cohesive failure) on breaking the attachment. The substrate is soiled, and the contact-adhesive article is unsuitable for reuse. In some instances, moreover, the surfaces of less strong substrates, for example papers, can be damaged. As contact-adhesive articles are used on substrates of all kinds of roughness, strength and chemical composition, a satisfactory match between adequate initial adhesivity and reversibly rebreakable end adhesivity is possible for whole-surface smooth coatings only in specific cases.

4. Part-surface coatings of contact adhesive which are applied to the carrier materials in the form of strips or other patterns can be advantageous, in particular for carriers having lower tear strength, such as, for example, paper. Owing to the smaller area of attachment, the tensile forces exerted on the carrier material in the course of separating the attached surfaces are kept in check, and splitting of the carrier material is avoided. However, in the areas of whole-surface attachment the force of adhesion to the substrate increases with time by the mechanism described in the preceding section, so that on suitably long attachment there is a danger that the contact-adhesive film will split on separation of the attached surfaces, in particular when the attached surfaces are separated in the direction of the strips.

5. Coatings of contact-adhesive microspheres of a suitable size (50–150 $\mu$m) show the time-dependent increase in the strength of attachment to a small extent. The elastomeric recovery forces of the spheres flattened off in the course of the pressure-sensitive attachment to the substrate tend toward the re-formation of the originally curved surface and thereby counteract any stronger flow of the contact adhesive into the microinch indentations of the substrate. The force employed in separating the attached surfaces acts concentratedly on the relatively small, circular, discrete attached flattened parts of the spheres and is distributed from there into the much bigger sphere volumes. As a result, the desired adhesive failure is brought about preferentially, and the undesirable cohesive failure is suppressed. Besides these advantages, this process also has some shortcomings and/or limitations. Anchoring the microspheres to the carrier requires a binder layer in which the spheres are partly submerged and which, owing to the larger wetting area, effects anchoring to the carrier surface. However, this principle requires a flat surface of limited absorbency; in order to prevent the binder from penetrating into the substrate and thus becoming ineffective in the sense described above. The choice of the carriers which are coatable by this principle is limited as a result and/or necessitates an additional, smoothing coat, for example for paper.

Moreover, application of the microspheres to the carrier material must be done in such a way as to produce a monoparticulate coating. In areas where microspheres are positioned on top of one another, reliable anchorage is no longer assured, since the anchoring mechanism described above then becomes ineffective. This condition is difficult to meet with a statistically clearly measurable size distribution of the microspheres. The statistical size distribution of the contact-adhesive microspheres, which matches that of a Gaussian distribution function, also has the disadvantage that the larger microspheres which protrude farther above the carrier surface are particularly highly stressed in pressure-sensitive adhesion, while the smaller ones are under little stress, if any. Furthermore, the recovery forces of the larger spheres have the effect that the bonds with the smaller spheres which are formed under the contact pressure break with time and cause a reduction in the strength of the bond.

It is the object of the present invention as far as possible to avoid the disadvantages described.

This object is achieved, surprisingly, with contact-adhesive calottes of defined, uniform size which are applied to suitable carrier materials in predetermined spacing and which are found to have excellent adhesive properties for manufacturing reversibly adherent, residuelessly detachable sheetlike structures. By means of their flat bottom surfaces, contact-adhesive calottes give more reliable anchorage to the carrier materials than, for example, corresponding microspheres do. Moreover, this generally requires no additional anchoring layers. The spherical surfaces of the calottes face the direction of the substrate to which they are to be attached and offer the contact-adhesion advantages which curved, contact-adhesive surfaces have in respect of reversible, residuelessly breakable attachment and which have already been described in section 5.

The invention accordingly provides residuelessly redetachable contact-adhesive sheetlike structures wherein as provided approximately calotte-shaped bonding sites which are up to about 600 $\mu$m in diameter at the base where the calottes stick to the sheetlike structure and which are produced by screen or gravure printing using high-solids dispersions of adhesive substances.

These reversibly adherent contact adhesive articles are favorably distinguished from those of the state of the art and, in addition to having convincing advantages, have the state of the art disadvantages to a much smaller degree.

The desired calotte shape of the bonding sites need not be fully realized in practice. For the purposes of the invention it is thus possible to use bonding sites having a non-circular or not perfectly circular base, since, owing to the pronounced structural viscosity and thixotropy, the bonding site assumes an approximate calotte shape. The adhesive composition used, accordingly, preferably has on application a pronounced structural viscosity and thixotropy, sufficiently high for forming bonding sites of approximate calotte shape.

Further preferred features of the adhesive composition are good contact-adhesivity, good film-forming properties and adequate elastomeric properties.

Suitable contact adhesives are in particular those based on (meth)acrylic acid esters with alkyl radicals of 4 to 12 carbon atoms.

However, small amounts of (meth)acrylic acid esters with alkyl radicals of 1 to 3 carbon atoms or of 13 to 18 carbon atoms can also be present. Small amounts (about 0–12%) of (meth)acrylic acid and/or other copolymerizable acids, such as maleic acid, fumaric acid or itaconic acid, can be present as copolymerized units. To increase the cohesion and improve the stability of the dispersion, it is also possible to use acrylonitrile or acrylamide and added crosslinking agents, for example N-methylolacrylamide or glycidyl methacrylate in conjunction with hydroxyl-carrying (meth) acrylic acid esters or polyfunctional acrylates, for example butanediol bisacrylate. Finally, some of the (meth)acrylic acid ester can be replaced by copolymerizable compounds such as vinyl acetate or vinyl propionate.

Contact-adhesive calottes anchored at their base to carrying materials are best produced by means of industrial printing methods of the screen-printing or gravure-printing type which are known per se, using, as the contact adhesives, dispersions of high solids content, preferably concentrated thixotropic aqueous contact-adhesive dispersions. Aqueous dispersions are preferred, but it is also possible to use dispersions of the organosol type, i.e. dispersions based on a high-boiling organic non-solvent, or even of the plastisol type, such as pastelike products comprising plasticizer plus plastics material. Aqueous dispersions preferably have a solids content of at least 45% by weight, especially of about 55–65% by weight.

Rotary screen printing basically comprises using a rotating seamless drum-shaped perforated round screen. In the inner shell, a mechanically or magnetically supported round or four-edged doctor squeezes the contact-adhesive dispersion fed into the drum onto the carrier web through the perforations of the screen wall. The carrier web is guided along the outside shell of the screen drum by means of a back-pressure roller at a speed which corresponds to the circumferential speed of the rotating screen drum.

The coating is subsequently dried in a hot-air duct or by infrared, i.e. high-frequency radiation.

The calotte shape is formed in this process by the following mechanism: the pressure from the doctor blade feeds the contact-adhesive dispersion through the perforations of the screen onto the carrier material. This carrier material is first of all surface-wetted by the dispersion in line with the hole geometry. The size of the calotte base thus formed is predetermined by the diameter of the hole in the screen. The bore is lifted away from the carrier as a function of the transport speed of the carrier web, i.e. as a function of the speed of rotation of the screen drum. Due to the internal cohesiveness of the contact-adhesive dispersion, the supply of contact-adhesive dispersion stored in the bore is drawn down by the base which is already adhering to the carrier, that is to say pushed by the doctor pressure onto the web. At the end of this transport of material, the more or less highly curved surface of the calotte forms above the predetermined base area, depending on the structural viscosity, thixotropy and flow of the dispersion. The ratio of height to base of the calotte, in line with this mechanism, substantially depends on the ratio of hole diameter to wall thickness of the screen drum and the physical properties (flow behavior, surface tension, angle of contact of the carrier material) of the dispersion. On drying, the height of the calotte decreases in line with the loss of water. The size and shape of the base which becomes anchored to the carrier material in the course of drying changes very little, if at all.

The calotte formation mechanism described requires carrier materials which are absorbent or at least wettable by the adhesive compositions. Non-wettable carrier surfaces should be treated by additional measures, such as, for example, electric corona discharge or coating with wettability-conferring substances.

The size and shape of the calottes can be definitively predetermined with the printing method described. Differences in size which are relevant to application and which, as described, can impair the quality of contact adhesive articles do not arise if this coating method is carried out correctly. The base diameter of the calottes can be chosen within the range from about 30 $\mu$m to about 600 $\mu$m) and the height of the calottes correspondingly from about 30 $\mu$m to about 600 $\mu$m. Base diameters of 80–500 $\mu$m are preferred, smaller diameters being suitable for smooth carrier materials and larger diameters, with correspondingly greater calotte height, for rougher or highly porous carrier materials.

The positioning of the calottes on the carrier is definitively predetermined by the geometry of the application system which is variable within wide limits, for example screen geometry or gravure geometry. The adjustable parameters refered to allow the desired adhesion properties of the coating to be adjusted very accurately, for matching to the various carrier materials and end uses.

The sheetlike structures according to the invention featuring mechanically applied contact-adhesive hemispheres, possess inter alia the advantages of the known microspheres without having their disadvantages:

It is found that mechanically applied calottes have a significantly narrower size distribution than chemically produced bead polymers. Whereas polymerization reactions produce molecular sizes or bead polymer sizes which follow a Gaussian distribution curve, tools for the mechanical application of calottes can be manufactured within tolerances tending toward zero.

It is also found that all applied calottes are involved in the bonding, since, owing to the manner of application, they all have the same dimensions, so that only the actually necessary amount of adhesive need be made available. This has the additional benefit of an appreciable saving of adhesive. Moreover, the adhesive bond is improved compared with state of the art reversible adhesive bonds.

It is also found that every carrier can be coated, irrespective of its surface roughness and absorbency, extremely economically. In particular, there is no need to smooth the carrier surface by mechanical action, such as, for example, glazing, or to apply preliminary coatings to fill out any unevenness. The disappearance of adhesive dispersions into porous carrier material can be avoided by using particularly coarsely divided dispersions. However, if the carrier material has poor adhesion properties, such as, for example, polyethylene, it is possible to use a primer which then has to act as a tackifier.

It is also found that reliable adhesion requires no binder, since the anchoring is ensured by the base area which is adapted to the surface structure of the carrier and which at any rate is larger than the area facing the substrate and involved in the bonding there.

It is also found that the size of the calottes is variable within very wide limits without the effect of the reversible attachment option being lost.

It is also found that the properties of the substrates contact-adhesively coated in this way can be adjusted for almost any purpose in which reversibility is required through the freely selectable parameters of the diameter of the calottes at the base, height of the calottes, geometric distribution of the calottes, and frequency (number per unit area).

It is also found that the properties of the adhesive material can be modified within a very wide range: from very soft, highly tacky and of low shearing strength to hard, slightly tacky and of high shearing strength.

It is also found that the three-dimensional shape of the calottes or approximate calottes, with its advantageous properties, is stable in reversible attachment due to its elastomeric properties. If only for that reason, this shape is constantly approached after deformation due to pressure or detachment of a substrate. This behavior can be supported by subsequent crosslinking with heat or irradiation (electron beam, UV, HF) or the use of fillers.

Hereinafter the invention is illustrated by examples which are not meant to limit the invention thereto. On the contrary, the person skilled in the art can make suitable modifications on the basis of his technical knowledge without thereby going outside the scope of the invention.

Figure 2:
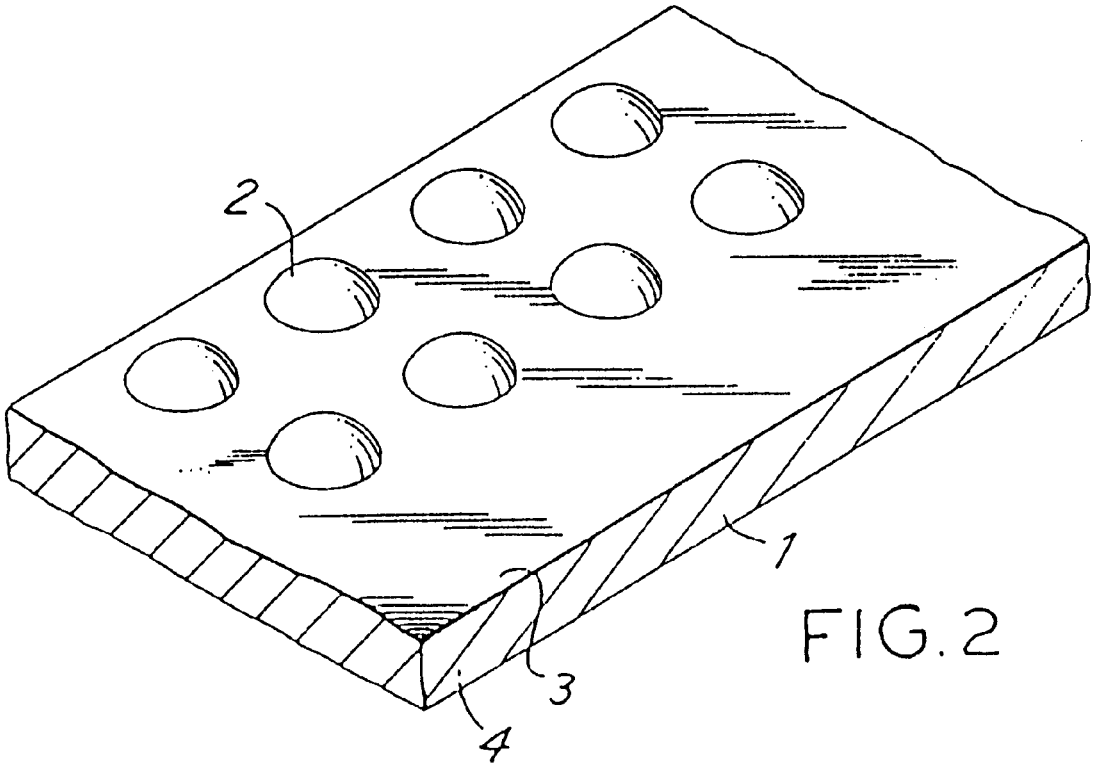

FIGS. 1 and 2 depict a contact-adhesive sheetlike structure according to the invention. On a carrier 1 made of paper there are calotte-shaped bonding sites 2 of self-adhesive material which are arranged in predetermined patterns or in geometric configuration. The surface 3 of the carrier 1 has no smoothing coat, nor is the back 4 of the carrier 1 provided with an adhesive-repellent layer.

EXAMPLE 1

A 15-liter-capacity polymerization apparatus equipped with a stirrer, a reflux condenser, a temperature sensor, a nitrogen inlet tube and a metering device is charged, with the oxygen of the air has been displaced by $N_2$ with 3.00 kg of 2-ethylhexyl acrylate, 0.134 kg of acrylic acid, 0.120 kg of butanediol monoacrylate, 0. 100 kg of butanediol diacrylate, 0.020 kg of tetrabromomethane, 0.050 kg of anionic emulsifier (the sodium salt of an ethoxylated and sulfonated nonylphenol) and 5.00 kg of deionized water. The contents are heated with stirring to 76° C. 10 g of ammonium peroxodisulfate dissolved in 50 g of $H_2O$ are then metered in. After the polymerization has started the reaction material is held at a temperature of 84°–86° C. After the exothermic reaction has died down the temperature is adjusted to 80° C.

After a reaction time of 40 minutes, 125 g of 25% strength aqueous ammonia solution, 2.5 kg of 2-ethylhexyl acrylate and a further 10 g of ammonium peroxodisulfate are added.

The polymerization is complete after a total reaction time of 6 hours.

The resultant polymer dispersion has the following data:

| | | |
|---|---|---|
| Solids content: | 54% | Viscosity |
| | Shear stress T | |
| Viscosity at 25° C.: | $\left(\frac{\text{dyn.}}{\text{cm}^2}\right)$ | $\left(\frac{\text{dyn. sec.}}{\text{cm}^2}\right)$ |
| | $2.2 \times 10^3$ | $1.3 \times 10^5$ |
| | $2.5 \times 10^3$ | $2.8 \times 10^4$ |

-continued

| | | |
|---|---|---|
| | $4.0 \times 10^3$ | $9.4 \times 10^3$ |
| Surface tension: | 55 dyn/cm 25° C. | |

A contact -adhesive sheetlike structure having calottes of the type defined is prepared as follows:

This acrylate dispersion is applied in a continuous manner in a film thickness of 1–20 g/cm$^2$, based on dry substance, to paper (or a nonwoven or a plastics sheet) by gravure or screen printing.

| Technical conditions: | | |
|---|---|---|
| Carrier web speed | about | 10–100 m/min |
| Screen geometry | about | 40–100 mesh |
| Blade setting | about | 1.5–30 min |
| Blade thickness | about | 150–300 μm |
| Contact | about | 2–6 (mm) |

The coat of adhesive is subsequently dried in a convection drying duct of conventional design to such an extent that it can be wound into the form of a roll without problems.

What is claimed is:

1. A residuelessly redetachable contact-adhesive sheetlike structure wherein are provided approximately calotte-shaped bonding sites which are up to about 600 μm in diameter at the base where the calottes stick, to *a surface of* the sheetlike structure *and wherein the sites are completely isolated from each other on the surface* and [which] are produced by screen or gravure printing using high-solids dispersions of adhesive substances.

2. A contact-adhesive sheetlike structure as claimed in claim 1 wherein the adhesive used has high surface tension, adhesivity, film-forming properties and elastomeric properties.

3. A contact-adhesive sheetlike structure as claimed in [claims 1 and 2] wherein the adhesive used is based on (meth)acrylic acid esters with or without small proportions of other monomer units.

4. A contact-adhesive sheetlike structure as claimed in [any one of claims 1–3] *claim 1* wherein the dispersions used are aqueous dispersions, or organosols or plastisols.

5. A contact-adhesive sheetlike structure as claimed in claim 4 wherein the aqueous dispersions used are concentrated thixotropic contact-adhesive dispersions having a solids content of 55–65% by weight.

6. A contact-adhesive sheetlike structure as claimed in [any one of claims 1–5] *claim 1* wherein the base diameter of the calotte-shaped bonding sites is 80–500[, in particular 100–400] μm.

7. A contact-adhesive sheetlike structure as claimed in [any one of claims 1–6] *claim 1–6* wherein the bonding sites are subsequently crosslinked.

8. A contact-adhesive sheetlike structure as claimed in claim 7 wherein the bonding sites are subsequently cross linked by electron beam.

9. A contact-adhesive sheetlike structure as claimed in [any one of claims 1–8] *claim 1* which has the most suitable geometric arrangement and number (per unit area) of bonding sites for the proposed adhesive attachment.

*10. A residuelessly redetachable adhesive article comprising a substrate bearing a plurality of mechanically applied approximately calotte-shaped adhesive sites, each site having a base in direct contact with a surface of the substrate and which is up to 600 μm in cross-base dimension and wherein the sites are completely isolated form each other on the surface of the substrate.*

*11. The article according to claim 10, wherein each base is from 80 to 500 μm in cross-base dimension.*

*12. The article according to claim 11, wherein each base is from 100 to 400 μm in cross-base dimension.*

*13. The article according to claim 10, wherein the height of each site is from about 30 to 600 μm.*

*14. The article according to claim 10, wherein each base is from about 30 to 600 μm in cross-base dimension.*

*15. A method of making a residuelessly redetachable adhesive article, comprising the steps of providing a substrate and mechanically applying a plurality of approximately calotte-shaped adhesive sites on a surface of the substrate each site having a base up to 600 μm in cross-base dimension and wherein the sites are completely isolated from each other on the surface of the substrate.*

*16. The method according to claim 15, wherein the step of mechanically applying comprises applying a high-solids dispersion of contact adhesives and drying.*

*17. The method according to claim 16, wherein the step of mechanically applying comprises gravure printing.*

*18. The method according to claim 16, wherein the step of mechanically applying comprises screen printing.*

*19. The method according to claim 15, wherein the step of mechanically applying a high solids dispersion comprises applying concentrated thixotropic contact-adhesive aqueous dispersions having a solids content of 55 to 65* by weight.

*20. The method according to claim 15, wherein each site is applied with a base from about 30 to 600 μm in cross-base dimension.*

* * * * *

UNITED STATES PATENT AND TRADEMARK OFFICE

CERTIFICATE OF CORRECTION

PATENT NO. : RE 37,612 E
DATED : March 26, 2002
INVENTOR(S) : Peter Gleichenhagen et al.

It is certified that error appears in the above-identified patent and that said Letters Patent is hereby corrected as shown below:

Column 7,
Line 31, after "… and…" delete "which"
Line 39, delete "[claims 1 and 2]" and insert -- claim 1 --
Line 43, delete "[any one of claims 1-3]"
Line 49, delete "[any one of claims 1-5]"
Lines 50 and 51, delete "[in particular 100-400um]"

Column 8,
Line 2, delete "[any one of claims 1-6]" also delete "claim 1-6" and substitute -- claim 1 --
Line 8, delete "[any one of claims 1-8]"

Signed and Sealed this

First Day of April, 2003

JAMES E. ROGAN
*Director of the United States Patent and Trademark Office*